(No Model.)

E. MINNICH.
COMBINED CORN HILLER AND CULTIVATOR.

No. 340,345. Patented Apr. 20, 1886.

Witnesses
John C. Miller
Percy White

Inventor
Elias Minnich
By his Attorney
T. H. Alexander

United States Patent Office.

ELIAS MINNICH, OF UNION, MICHIGAN.

COMBINED CORN HILLER AND CULTIVATOR.

SPECIFICATION forming part of Letters Patent No. 340,345, dated April 20, 1886.

Application filed January 30, 1886. Serial No. 190,329. (No model.)

*To all whom it may concern:*

Be it known that I, ELIAS MINNICH, of Union, in the county of Cass and State of Michigan, have invented certain new and useful Improvements in a Combined Corn Hiller and Cultivator; and I do hereby declare that the following is a full, clear, and exact description thereof, reference being had to the accompanying drawings, and to the letters of reference marked thereon, which form part of this specification, in which—

Figure 1:
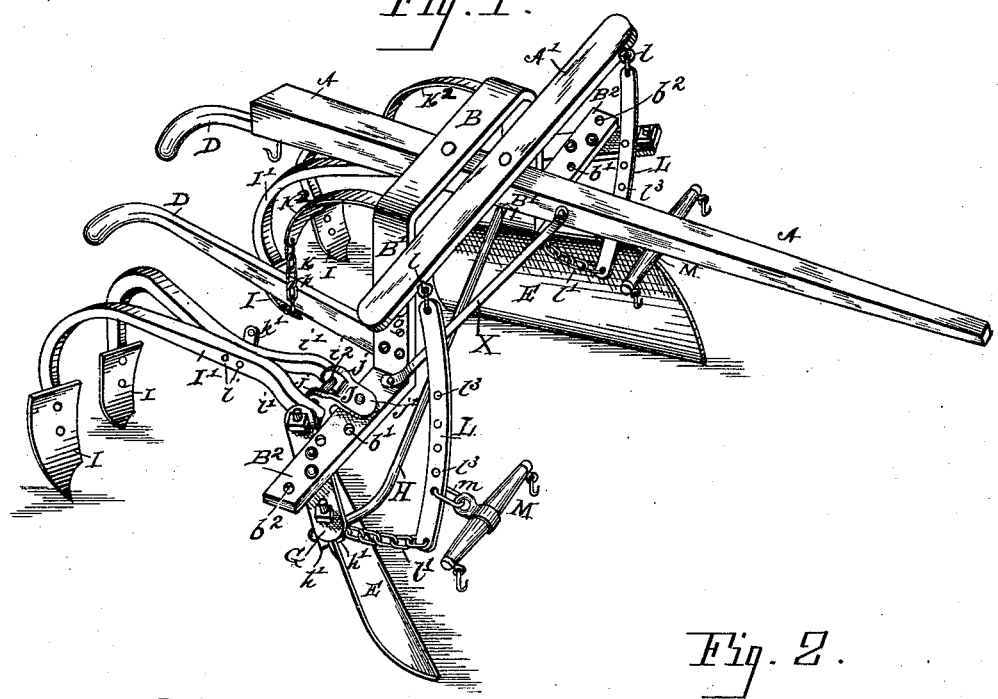
Figures 2, 3:
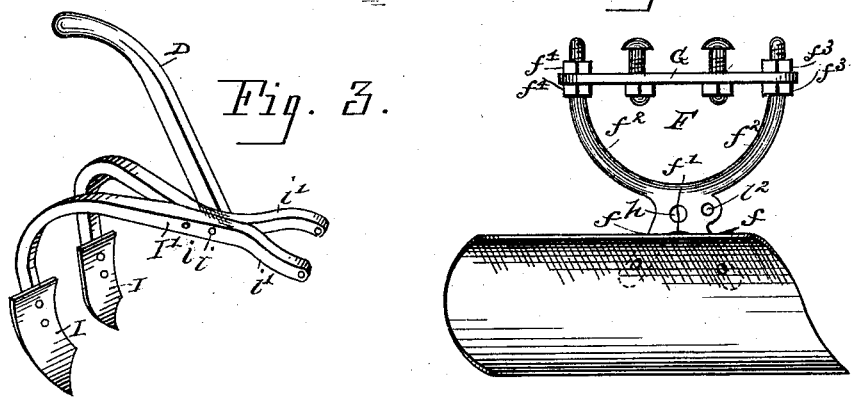
Figures 4, 5:
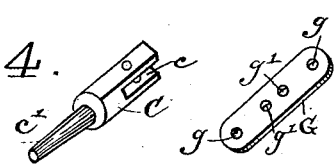

Figure 1 is a perspective view of the invention complete. Fig. 2 is a view of one of the hilling-shovels. Fig. 3 is a detail perspective view showing a handle applied to one of the shovel-frames. Figs. 4 and 5 are details.

This invention relates to improvements in combined corn hillers and cultivators; and it consists in the construction and novel arrangement of parts hereinafter described, and pointed out in the appended claims.

Referring to the accompanying drawings by letter, A designates the tongue or draft-pole of the machine secured to the main frame, and having pivoted upon it at a proper point the center of the equalizing draft-bar A'.

B is a supporting-frame, having its center bolted to the tongue a short way to the rear of the draft-bar. At equal distances on each side of the tongue the supporting-frame bends vertically downward, so as to form the opposite arms, B' B', which at a proper point bend outward, so as to form the horizontal extensions $B^2 B^2$.

X X are brace-rods connecting the frame B and the tongue.

The vertical arms B' are provided with the two lines of opposite holes $b$ $b$, and the extensions $B^2$ are provided with the two lines of non-opposite holes $b'$ $b'$. The holes have purposes hereinafter explained.

$b^2$ $b^2$ are holes at the ends of the extensions $B^2$. By means of these holes bifurcated journaled stub ends, hereinafter described, may be bolted to the said extensions, and the machine mounted on wheels when used as a cultivator, the frame B then serving as an axle.

C is one of the stub ends, having its bifurcated inner end, $c$, bolted through proper openings to the end of one of the extensions $B^2$, the bolt passing through the opening $b^2$, as described. The journal $c'$ is formed on the outer end of the stub end and the wheel attached thereon in the usual manner.

D D are the handles, having their inner ends secured to the arms B' B' of the supporting-frame by means of the holes $b$ and proper bolts, as shown.

The hilling-shovels on each side and their attachments being of identical construction, the description of one only is necessary.

E is one of the hilling-shovels, curved downward and inward from its upper edge, and provided at its front lower corner with a proper entering point. The outer surface of said shovel is bolted near its upper edge to the downwardly-extending diverging arms $f$ of a frame, F, the shaft $f'$ of which is bifurcated a short distance above the shovel, so as to form a wide yoke, the upwardly-extending arms $f^2$ of which are threaded and pass through unthreaded openings $g$ $g$ in the bar or plate G, near the ends of the same.

$f^3$ $f^3$ are nuts on the front arm of the yoke above and below the front end of the plate G, and $f^4$ $f^4$ are similar nuts on the rear arm of the yoke above and below the rear end of said plate. By means of these nuts the inclination of the shovel is adjusted, as hereinafter explained.

$g'$ $g'$ are holes through the plate G, equally distant from its center. The space between the said holes equals the distance from any one hole $b'$ in the rear row of holes through the extension $B^2$ to the outer adjacent hole in the front row of the same, so that by proper bolts and nuts the plate G, and consequently the frame F and shovel E, may be secured to and adjusted at different positions outward on the extension $B^2$, with the shovel inclining forward and outward from heel to point, as shown.

To adjust the point of the shovel upward the front nuts, $f^3$, are screwed up and the rear nuts, $f^4$, screwed down, and the reverse to adjust the point downward.

If the nuts were used on one arm, $f^2$, only, it would require double the amount of travel to give the shovel an equal degree of inclination, and the arms $f^2$ would be likely to bind in the holes in the plate G.

H H are rods having their upper ends bolted or otherwise properly secured to the tongue slightly to the front of the draft-bar, running thence downwardly, rearwardly, and outwardly, and having their lower ends bent nearly horizontal and threaded. Each of the said lower ends passes through an opening, $h$, through the shaft $f'$ of a frame, F, and has the nuts $h'$ $h'$ on each side of said opening, so that by screwing the said nuts inward the angle that the lower edge of the shovel makes with the ground becomes more acute, and the shovel will consequently take up more dirt. The joints are loose enough and the frame B elastic enough to allow the action of the rods H and shovels.

I I are the cultivator-blades secured to the outer downwardly-projecting ends of the cultivator-arms I'. The said arms are arranged in pairs on each side of the machine. The members of each pair are bolted together at $i$ $i$, near their inner ends, and then running rearward diverge and curve downward to the cultivator-blades. The inner ends of the pair are formed into a yoke, $i'$, which is pivoted by means of the transverse rod $i^2$ upon the rearward-extending ears $j$ $j$ of a bracket, J, the front part of which consists of two horizontal plates, $j'$, between which the rear edge of the extension $B^2$ passes, the bracket being pivoted on said extension by a screw which passes through proper openings in the plates $j'$, and through any one of the holes $b'$ in the rear row of the extension, so that the bracket and cultivator-blades are adjustable outward and inward on the extension.

K is a chain composed of the links $k$, any one of which may be engaged to a staple, $k'$, which is secured to the pair of cultivator-bars to the rear of its yoke. The upper end of the chain K is properly secured to the lower end of a curved spring-plate, $K^2$, the upper end of which is bolted or riveted to the frame B to one side of the tongue. By means of the chains K the cultivator-points may be raised and lowered when desirable, and the spring-plates prevent jar and breakage when the said points engage against obstruction on the ground.

L L are curved draft-plates, each of which is swung by a link at its upper end to a staple, $l$, secured to the draft-bar A', near one end of the same. The lower end of the draft-plate is connected by a chain, $l'$, to a staple, $l^2$, secured to the shaft $f'$ of the frame F, on its inner side.

$l^3$ $l^3$ are a series of holes in the draft-plate L, into any one of which the hook or link $m$ of the central band of a single-tree, M, may be engaged, so that the single-tree is adjustable up and down on the draft-plate. The single-tree has at its ends proper trace-hooks for the attachment of a horse, which is also properly harnessed on the tongue.

By means of the draft-plates and connections the pull of the horses is more in line with the resistance of the hilling-shovels or cultivator-points, so that the machine runs straighter and is under more control. They also reduce the strain of the tongue on the necks of the horses.

When the machine is used as a cultivator, the stub ends and wheels are left on, but the handles are removed, as they are not necessary to direct the cultivator-points.

In using the machine as a hiller the stub ends, wheels, and cultivator-points are detached and the handles attached to direct the shovels which run on either side of the row of corn, gather the earth by their points, drive it inward and discharge it from their heels, so as to hill on each side of the row of plants.

Having described my invention, I claim—

1. In a machine to hill corn or other plants, the combination of the tongue, the transverse supporting-frame secured thereto and provided with the horizontal extensions $B^2$, having the rows of holes $b'$, the shovel-frames F, having the hilling-shovels secured to their lower ends, and provided with the upward-extending arms $f^2$, and the plates G, having the arms $f^2$ secured to them near their ends, and provided with the holes $g'$, by means of which and proper bolts engaging the holes $b'$ the shovel-frames are rendered adjustable on the extensions $B^2$, substantially as specified.

2. In a machine to hill corn or other plants, the combination of the tongue, the transverse supporting frame secured thereto and provided with the horizontal extensions $B^2$, the plates G, adjustably secured to said extensions, and provided with the holes $g$, the shovel-frames F, having the shovels secured to their lower ends and provided with the threaded upwardly-extending arms $f^2$, and the nuts $f^3$ and $f^4$ $f^4$, whereby the shovel-frames are adjusted on the plates G, substantially as specified.

3. In a machine to hill corn or other plants, the combination of the tongue, the supporting-frame B, provided with the horizontal extensions $B^2$, the shovel-frames F, secured to said extensions by means of the plates G and proper bolts, the hilling-shovels secured to the lower ends of the frame F, the rods H, secured at their upper ends to the tongue, and with their lower ends passing through openings in the stems of the frames F, and the nuts $h'$, by means of which and said rods the lower edges of the shovels are adjusted outward and inward with reference to the machine, substantially as specified.

4. The combination of the tongue A, frame B, adapted to carry and adjust the hilling-shovels E E, or the cultivators I I, and provided with the vertical portions B, having rows of openings $b$, and the handles D, rigidly secured to the main frame and adapted to have their inner ends bolted higher or lower on the vertical portions B of said frame through the holes $b$, substantially as specified.

In testimony that I claim the foregoing as my own I affix my signature in presence of two witnesses.

ELIAS MINNICH.

Witnesses:
JAMES DUSHANE,
CHAS. H. BARTLETT.